(12) United States Patent
Watanabe et al.

(10) Patent No.: US 11,312,900 B2
(45) Date of Patent: Apr. 26, 2022

(54) METHOD FOR PRODUCING NITRIDE FLUORESCENT MATERIAL, AND NITRIDE FLUORESCENT MATERIAL

(71) Applicant: NICHIA CORPORATION, Anan (JP)

(72) Inventors: Hiroyuki Watanabe, Itano-gun (JP); Shigeyuki Suzuki, Tokushima (JP); Shoji Hosokawa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 24 days.

(21) Appl. No.: 16/783,630

(22) Filed: Feb. 6, 2020

(65) Prior Publication Data

US 2020/0255728 A1    Aug. 13, 2020

(30) Foreign Application Priority Data

Feb. 8, 2019 (JP) .............................. JP2019-021936

(51) Int. Cl.
*C09K 11/08* (2006.01)
*C09K 11/02* (2006.01)
*C09K 11/77* (2006.01)

(52) U.S. Cl.
CPC ........ *C09K 11/0883* (2013.01); *C09K 11/025* (2013.01); *C09K 11/77348* (2021.01)

(58) Field of Classification Search
CPC .......... C09K 11/0883; C09K 11/77348; C09K 11/025
See application file for complete search history.

(56) References Cited

U.S. PATENT DOCUMENTS

| 8,801,968 B2 | 8/2014 | Petry et al. |
| 9,006,966 B2 * | 4/2015 | Chen ..................... H05B 33/12 |
| | | 313/503 |
| 10,738,238 B2 | 8/2020 | Fiedler et al. |
| 2011/0090683 A1 | 4/2011 | Petry et al. |
| 2018/0044585 A1 | 2/2018 | Fiedler et al. |
| 2018/0230376 A1 * | 8/2018 | Schmidt ............. C09K 11/0883 |

FOREIGN PATENT DOCUMENTS

| CN | 103450874 A | 12/2013 |
| JP | H06041526 A | 2/1994 |
| JP | 2006282809 A | 10/2006 |
| JP | 2007-169452 A | 7/2007 |
| JP | 2011504544 A | 2/2011 |
| JP | 2013049745 A | 3/2013 |
| JP | 2013212998 A | 10/2013 |
| JP | 2018512481 A | 5/2018 |
| WO | 2010103773 A1 | 9/2010 |
| WO | 2015001860 A1 | 1/2015 |

* cited by examiner

*Primary Examiner* — C Melissa Koslow
(74) *Attorney, Agent, or Firm* — Hunton Andrews Kurth LLP (57) ABSTRACT

A method for producing a nitride fluorescent material includes preparing fluorescent material core particles having a composition containing Sr, Ca, Eu, Al, Si, and N, in which, when a molar ratio of Al in the composition is 1, a molar ratio of Sr is in a range of 0.45 or more and 1.1 or less, a molar ratio of Ca is in a range of more than 0 and less than 0.55, a molar ratio of Eu is in a range of more than 0 and 0.033 or less, a total molar ratio of Sr, Ca, and Eu is 1.1 or less, a molar ratio of Si is in a range of 0.81 or more and 1.21 or less, and a molar ratio of N is in a range of 2.25 or more and 3.85 or less, subjecting them to a first heat treatment and a second heat treatment.

4 Claims, 7 Drawing Sheets

METHOD FOR PRODUCING NITRIDE FLUORESCENT MATERIAL, AND NITRIDE FLUORESCENT MATERIAL

CROSS-REFERENCE TO RELATED PATENT APPLICATION

This application claims priority to Japanese Patent Application No. 2019-021936, filed on Feb. 8, 2019, the disclosure of which is hereby incorporated by reference in its entirety.

BACKGROUND

Technical Field

The present disclosure relates to a method for producing a nitride fluorescent material, and a nitride fluorescent material. In this specification, the "fluorescent material" is used in the same meaning as a "fluorescent phosphor".

Description of Related Art

A light emitting device constructed by combining a light emitting diode (hereinafter referred to as "LED") or a laser diode (hereinafter referred to as "LD") with a fluorescent material is actively applied to backlights for illumination devices and liquid-crystal display devices and has been much popularized in the art. As a nitride fluorescent material for use in light emitting devices, for example, there is known $(Sr,Ca)AlSiN_3$:Eu disclosed in International Unexamined Patent Publication No. WO2015/001860.

SUMMARY

A nitride fluorescent material is required to be further improved in durability.

Given the situation, an embodiment of the present disclosure is to obtain a nitride fluorescent material excellent in durability.

The present disclosure includes the following embodiments.

The first embodiment of the present disclosure is a method for producing a nitride fluorescent material, which includes preparing fluorescent material core particles having a composition containing Sr, Ca, Eu, Al, Si, and N, in which, when a molar ratio of Al in the composition is 1, a molar ratio of Sr is in a range of 0.45 or more and 1.1 or less, a molar ratio of Ca is in a range of more than 0 and less than 0.55, a molar ratio of Eu is in a range of more than 0 and 0.033 or less, a total molar ratio of Sr, Ca, and Eu is 1.1 or less, a molar ratio of Si is in a range of 0.81 or more and 1.21 or less, and a molar ratio of N is in a range of 2.25 or more and 3.85 or less, then subjecting the fluorescent material core particles to a first heat treatment by bringing the fluorescent material core particles into contact with urea, a silicate and water at a temperature in a range of 70° C. or higher and 150° C. or lower to obtain first heat treated fluorescent material core particles, and subjecting the first heat treated fluorescent material core particles to a second heat treatment at a temperature in a range of 350° C. or higher and 600° C. or lower.

The second embodiment of the present disclosure is a nitride fluorescent material containing fluorescent material core particles having a composition containing Sr, Ca, Eu, Si, Al, and N, in which, when a molar ratio of Al in the composition is 1, a molar ratio of Sr is in a range of 0.45 or more and 1.1 or less, a molar ratio of Ca is in a range of more than 0 and less than 0.55, a molar ratio of Eu is in a range of more than 0 and 0.033 or less, a total molar ratio of Sr, Ca, and Eu is 1.1 or less, a molar ratio of Si is in a range of 0.81 or more and 1.21 or less, and a molar ratio of N is in a range of 2.25 or more and 3.85 or less, and containing, on a surface of the fluorescent material core particles and in the order from a side of the fluorescent material core particles, a first film containing at least one element selected from the group consisting of Sr, Ca, Eu, Si, and Al, and oxygen, and a second film containing at least Si.

According to the embodiments of the present disclosure, there is provided a nitride fluorescent material excellent in durability.

DETAILED DESCRIPTION

The method for producing a nitride fluorescent material and the nitride fluorescent material of the present disclosure are described on the basis of embodiments. However, the embodiments described below are exemplifications for embodying the technical idea of the present invention, and the present invention is not limited to the production method for a fluorescent material and the nitride fluorescent material described below. In this description, the relationship between the color names and the chromaticity coordinates, and the relationship between the wavelength range of light and the color names of monochromic light are in accordance with JIS Z8110.

Method for Producing Nitride Fluorescent Material

The method for producing a nitride fluorescent material of the present disclosure may include preparing fluorescent material core particles having a composition containing Sr, Ca, Eu, Al, Si, and N, in which, when a molar ratio of Al in the composition is 1, a molar ratio of Sr is in a range of 0.45 or more and 1.1 or less, a molar ratio of Ca is in a range of more than 0 and less than 0.55, a molar ratio of Eu is in a range of more than 0 and 0.033 or less, a total molar ratio of Sr, Ca, and Eu is 1.1 or less, a molar ratio of Si is in a range of 0.81 or more and 1.21 or less, and a molar ratio of N is in a range of 2.25 or more and 3.85 or less, then subjecting the fluorescent material core particles to a first heat treatment at a temperature in a range of 70° C. or higher and 150° C. or lower by bringing urea, a silicate, water, and the fluorescent material core particles into contact with each other, and subjecting the fluorescent material core particles that have been subjected to the first heat treatment, to a second heat treatment at a temperature in a range of 350° C. or higher and 600° C. or lower.

Figure 1:
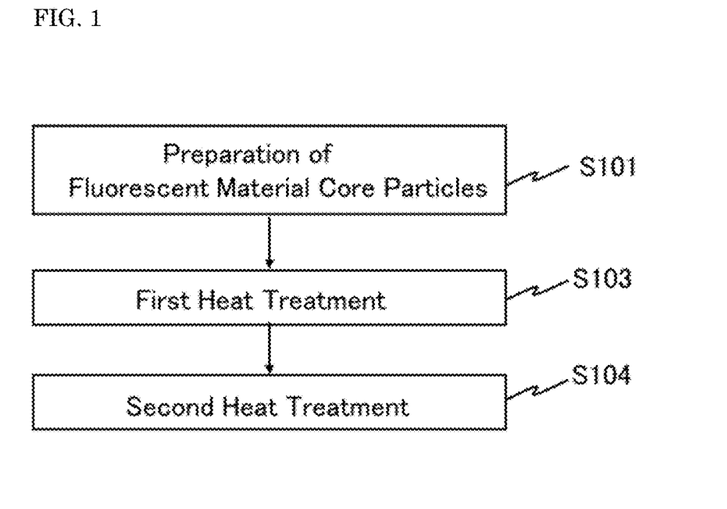
FIG. 1 is a flowchart of a method for producing a nitride fluorescent material according to the present disclosure.
Figure 2:
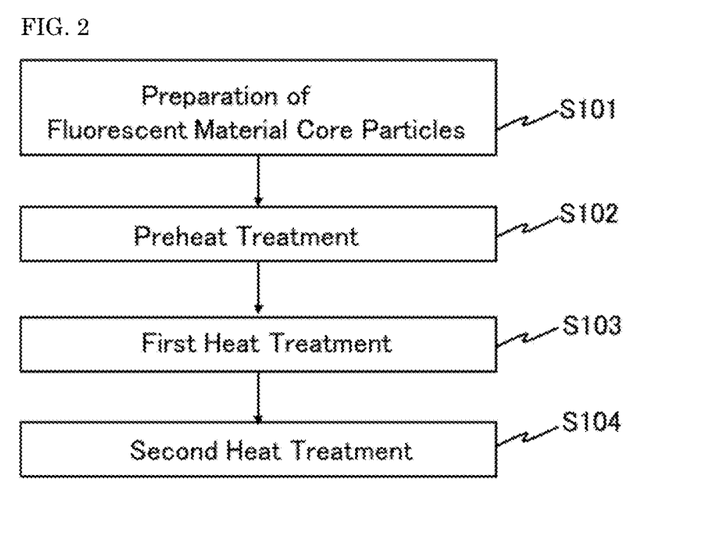
FIG. 2 is a flowchart of another method for producing a nitride fluorescent material according to the present disclosure.

FIG. 1 and FIG. 2 each are a flowchart showing an example of a process sequence of a method for producing a nitride fluorescent material. With reference to the drawings, a process for the production method for a nitride fluorescent material is described. As shown in FIG. 1, the method for producing a nitride fluorescent material includes a preparation step S101 for preparing fluorescent material core particles, a first heat treatment step S103 for carrying out a first heat treatment at a temperature in a range of 70° C. or higher and 150° C. or lower by bringing urea, a silicate, water, and the fluorescent material core particles into contact with each other, and a second heat treatment step S104 for carrying out a second heat treatment for the fluorescent material core particles having been processed for the first heat treatment, at a temperature in a range of 350° C. or higher and 600° C. or lower. As shown in FIG. 2, the method for producing a nitride fluorescent material may include a preheat treatment step S102 for carrying out a preheat treatment at a temperature of 70° C. or higher and 150° C. or lower.

Preparation of Fluorescent Material Core Particles

The fluorescent material core particles may have a composition containing Sr, Ca, Eu, Al, Si, and N, in which, when a molar ratio of Al in the composition is 1, a molar ratio of Sr is in a range of 0.45 or more and 1.1 or less, a molar ratio of Ca is in a range of more than 0 and less than 0.55, a molar ratio of Eu is in a range of more than 0 and 0.033 or less, a total molar ratio of Sr, Ca, and Eu is 1.1 or less, a molar ratio of Si is in a range of 0.81 or more and 1.21 or less, and a molar ratio of N is in a range of 2.25 or more and 3.85 or less.

Eu contained in the composition of the fluorescent material core particles is an activating element, and when the molar ratio of Al in the composition of the fluorescent material core particles is 1, the molar ratio of Eu is, for the purpose of attaining a high light emission intensity, more preferably in a range of 0.0001 or more and 0.033 or less, even more preferably in a range of 0.001 or more and 0.0275 or less. Ca is an element that constitutes the host crystal of the fluorescent material core particles together with Sr, Al, Si, and N. For obtaining a stable crystal structure and a desired chromaticity, the molar ratio of Ca is, when the molar ratio of Al in the composition of the fluorescent material core particles is 1, preferably in a range of 0.001 or more and less than 0.55, more preferably within a range of 0.005 or more and less than 0.55.

Preferably, the fluorescent material core particles have a composition represented by the following formula (1):

$$Sr_uCa_vEu_wSi_xAl_yN_z \quad (I)$$

wherein u, v, w, x, y, and z each satisfy $0.5 \leq u \leq 1.0$, $0 < v < 0.5$, $0 < w \leq 0.03$, $u+v+w \leq 1.0$, $0.9 \leq x \leq 1.1$, $0.9 \leq y \leq 1.1$, $2.5 \leq z \leq 3.5$.

The fluorescent material core particles can be obtained by heat-treating a raw material mixture prepared by mixing an Sr source, a Ca source, an Eu source, an Si source, an Al source, and an N source in such a manner that the molar ratio of each element in the composition to constitute the fluorescent material core each could fall within the above-mentioned range.

As the raw materials, usable are compounds each containing at least one element selected from the group consisting of Sr, Ca, Eu, Si, Al, and N to be contained in the composition of the fluorescent material core particles. A metal simple substance of Sr, Ca, Eu, Si, or Al may be used. The compounds each containing at least one element selected from the group consisting of Sr, Ca, Eu, Si, Al, and N to be contained in the composition of the fluorescent material core particles include nitrides, hydrides, oxynitrides, oxides, hydroxides, fluorides, chlorides, amide compounds, and imide compounds. The raw materials for use herein are preferably nitrides since the amount of the impurities to be contained in the resultant fluorescent material core particles can be reduced. Specifically, the raw materials include $Sr_2N$, $SrN$, $Sr_3N_2$, $SrF_2$, $SrH_2$, $Ca_3N_2$, $CaF_2$, $CaH_2$, $EuN$, $EuF_3$, $EuH_3$, $Si_3N_4$, $Si(NH)_2$, $Si_2N_2NH$, $Si(NH_2)_4$, $AlN$, $AlH_3$, $AlF_3$, and $LiAlH_4$.

The raw material mixture may be prepared by dry-mixing the raw materials using any of a ball mill, a Henschel mixer, a V-blender, or a mortar with pestle, or may be prepared by wet-mixing the raw materials with a solvent added.

The raw material mixture may contain a flux. Examples of the flux include an alkaline earth metal halide. Regarding flux addition, a flux may be so prepared that the cation element ratio could correspond to the composition of the fluorescent material core particles to be produced and may be added as a part of the raw materials for the fluorescent material core particles, or after each raw material has been added so as to prepare a composition of the intended fluorescent material core particles, an additional flux may be further added.

The temperature for heat treatment of the raw material mixture is, for example, 1200° C. or higher, preferably 1500° C. or higher, more preferably 1900° C. or higher. The temperature for heat treatment of the raw material mixture is, for example, 2200° C. or lower, preferably 2100° C. or lower, more preferably 2050° C. or lower. Through heat treatment of the raw material mixture at a temperature not lower than a predetermined level, Eu can readily penetrate into the crystal structure of a fluorescent material core particle to efficiently give fluorescent material core particles having desired light emission characteristics. When the temperature for heat treatment of the raw material mixture is not higher than a predetermined level, the resultant fluorescent material core particles can be prevented from being decomposed.

The raw material mixture may be heat-treated at a constant temperature, or may be heat-treated in a mode of multistage heat treatment at different heat treatment temperatures. In the case of multistage heat treatment, for example, a first stage heat treatment may be carried out at 800° C. or higher and 1400° C. or lower, and then, after gradual temperature rising, a second stage heat treatment may be carried out at 1500° C. or higher and 2100° C. or lower. The heating time for the heat treatment may be, for example, 1 hour or more and 48 hours or less. The cooling time for the heat treatment may be, for example, 0.1 hours or more and 20 hours or less. The heat treatment of the raw material mixture may have a retention time at a predetermined temperature. The retention time may be, for example, 0.5 hours or more and 48 hours or less.

The atmosphere for heat treatment of the raw material mixture is preferably an atmosphere containing a nitrogen gas, and is more preferably an atmosphere containing substantially a nitrogen gas alone. In the case where the atmosphere for the heat treatment is an atmosphere containing a nitrogen gas, the raw materials of nitrides or the fluorescent material core particles to be formed through the heat treatment can be prevented from being decomposed. In the case where the atmosphere for the heat treatment is an atmosphere containing a nitrogen gas, the atmosphere may further contain a rare gas such as argon, neon, or helium, and any other gas such as hydrogen, carbon dioxide, carbon monoxide, oxygen, or ammonia, in addition to the nitrogen gas. In the case where the atmosphere for the heat treatment is an atmosphere containing a nitrogen gas, the content of the nitrogen gas in the atmosphere is, for example, preferably 90% by volume or more, more preferably 95% by volume or more. When the content of the gas that contains any element other than nitrogen is controlled to not be higher than a predetermined level, reduction in the light emission intensity of the resultant fluorescent material to be caused by formation of impurities from those gaseous components can be prevented.

The pressure in heat treatment of the raw material mixture may be, for example, normal pressure to 200 MPa as a gauge pressure. From the viewpoint of preventing decomposition of the nitride fluorescent material to be formed, the pressure is preferably higher, and is preferably in a range of 0.1 MPa or more and 200 MPa or less, more preferably in a range of 0.6 MPa or more and 1.2 MPa or less as there are less industrial equipment constraints.

Heat treatment of the raw material mixture may be carried out, for example, using a gas-pressed electric furnace. Heat treatment of the raw material mixture may be carried out, for example, by filling the raw material mixture in a crucible, a boat formed of a carbon material such as graphite or a boron nitride (BN) material. For the crucible or the boat in which the raw material mixture is filled, an alumina ($Al_2O_3$) or molybdenum (Mo) material may also be used. Among these, a crucible or a boat made of a boron nitride material is preferably used.

The calcined body obtained through heat treatment of the raw material mixture may be granulated according to a combined treatment of crushing, grinding, and classification. Through the granulation step, fluorescent material core particles having a desired particle size can be obtained. Specifically, the resultant calcined body may be roughly ground, and then further ground to have a predetermined particle size, using an ordinary grinding machine such as a ball mill, a jet mill, or a shaking mill. In the case where particles having different particle sizes exist after grinding, they may be classified to obtain fluorescent material core particles having a desired particle size. The calcined body before and after classification may be subjected to a washing treatment by bringing it into contact with deionized water, an acid solution, or a basic solution, for the purpose of removing thermal degradation products from the surface of the calcined body.

Specifically, for example, by heat treatment of a raw material mixture prepared by mixing compounds that contain constituent elements to give a composition ratio of Sr:Ca:Eu:Al:Si=0.937:0.049:0.014:1.0:1.0, fluorescent material core particles having a composition such that the charge-in composition ratio of the constituent elements is reflected on the content ratio of Sr, Ca, Eu, Al, and Si can be obtained. The fluorescent material core particles obtained through heat treatment of a raw material mixture may contain an oxygen component contained in the raw materials, or may have a composition ratio that somewhat differs from the charge-in composition ratio owing to decomposition or scattering of elements contained in the raw materials during heat treatment. By changing the blending ratio of raw materials, the composition of the intended fluorescent material core particles can be changed.

First Heat Treatment

The resultant fluorescent material core particles may be subjected to a first heat treatment by bringing the fluorescent material core particles into contact with urea, a silicate, and water at a temperature in a range of 70° C. or higher and 150° C. or lower.

By heat treatment of the fluorescent material core particles through contact with water at a temperature in a range of 70° C. or higher and 150° C. or lower, a first film that contains at least one element selected from the group consisting of the constituent elements of the fluorescent material core particles, Sr, Ca, Eu, Si, and Al, and oxygen is formed on the surfaces of the fluorescent material core particles.

Through the first heat treatment of bringing the fluorescent material core particles into contact with urea, a silicate, and water at a temperature in a range of 70° C. or higher and 150° C. or lower, urea and the silicate react, and urea hydrolyzes to form silicon dioxide, ammonia, and a carbonate, forming a second film containing at least Si on the surface of the first film. The second film may contain silicon dioxide ($SiO_2$) formed by the reaction of urea and the silicate, and may contain any other element than Si, such as Al, along with Si. The first film and the second film thus formed on the surface of the fluorescent material core particle in the order from the side of the fluorescent material core particle each may function as a protective film from external environments and, for example, protect the fluorescent material core from water in air.

Preheat Treatment

Before the first heat treatment, the fluorescent material core particles may be brought into contact with water, and subjected to a preheat treatment within a range of 70° C. or higher and 150° C. or lower. Preheat treatment prior to the first heat treatment forms a first film that contains at least one element selected from the group consisting of the constituent elements of the fluorescent material core particles, Sr, Ca, Eu, Si, and Al, and oxygen. The preheat treatment increases the thickness of the first film that contains at least one element selected from the group consisting of the constituent elements of the fluorescent material core particles, Sr, Ca, Eu, Si, and Al, and oxygen (hereinafter the thickness may also be referred to as "the thickness of the first film"), and the resultant film can be a protective film for protecting the fluorescent material core particles from external influences such as high temperature and high humidity.

When the temperature for the first heat treatment or the preheat treatment falls within a range of 70° C. or higher and 150° C. or lower, the surfaces of the fluorescent material core particles can react relatively gently with water so that the elements constituting the fluorescent material core particles can bond via oxygen to form a first film having a stable structure and having a nearly uniform thickness. The temperature for the first heat treatment or the preheat treatment is, for the purpose of forming a first film having a more stable structure in which the elements constituting the fluorescent material core particles and oxygen bond, preferably within a range of 80° C. or higher and 140° C. or lower, more preferably within a range of 90° C. or higher and 130° C. or lower. When the temperature for the first heat treatment falls within a range of 70° C. or higher and 150° C. or lower, silicon dioxide is formed through reaction of urea and a silicate to increase the thickness of the second film (hereinafter referred to as "the thickness of the second film").

The treatment time for the first heat treatment or the preheat treatment is preferably in a range of 1 hour or more and 24 hours or less, more preferably in a range of 2 hours or more and 20 hours or less, even more preferably in a range of 3 hours or more and 18 hours or less. When the heat treatment time for the first heat treatment or the preheat treatment is in a range of 1 hour or more and 24 hours or less, the surfaces of the fluorescent material core particles can relatively gently react with water through the first heat treatment or the preheat treatment to form a first film having a stable structure in which the elements constituting the fluorescent material core particles bond via oxygen, and further, a second film containing at least Si can be formed through reaction of urea and a silicate.

In the first heat treatment, preferably, the amount of the silicate is in a range of 2% by mass or more and 5% by mass or less relative to 100% by mass of the fluorescent material core particles. When urea, a silicate, water, and the fluorescent material core particles are reacted under the condition where the amount of the silicate is in a range of 2% by mass or more and 5% by mass or less relative to 100% by mass of the fluorescent material core particles, a second film having a sufficient film thickness capable of functioning as a protective film can be formed. The silicate includes an alkali metal silicate and an alkaline earth metal silicate, and examples include potassium or sodium silicate having a compositional formula, $K_2SiO_3$ or $Na_2SiO_3$. The blending ratio of urea and the silicate (urea/silicate) may be in a range of 1:10 or more and 10:1 or less, as a molar ratio, or may be in a range of 1:5 or more and 5:1 or less, or may be in a range of 1:3 or more and 31 or less, or may also be 1:1. The amount of water in the first heat treatment or the preheat treatment is not specifically limited. The amount of water in the preheat treatment or the first heat treatment may be in a range of 50% by volume or more and 500% by volume or less relative to 100% by volume of the fluorescent material core particles so as to form a first film and/or a second film having a uniform thickness and having a stable structure.

In the case where the fluorescent material core particles are preheat-treated, the ratio by mass of the silicate in the first heat treatment is preferably in a range of 2% or more and 5% or less relative to 100% of the preheat-treated fluorescent material core particles. Even in the case where the fluorescent material core particles are preheat-treated, when urea, a silicate, water, and the fluorescent material core particles are reacted in such a manner that the amount of the silicate is in a range of 2% by mass or more and 5% by mass or less relative to 100% by mass of the preheat-treated fluorescent material core particles, a second film containing at least Si and having a film thickness sufficient enough to function as a protective film can be formed. Even in the case where the fluorescent material core particles are preheat-treated, the blending ratio of urea to the silicate (urea/silicate, by mol) may be the same as that falling within the above-mentioned range.

The atmosphere for the preheat treatment or the first heat treatment may be an atmosphere containing oxygen, or may be an air atmosphere. The pressure in the preheat treatment or the first heat treatment may be an atmospheric pressure.

After the first heat treatment and before the second heat treatment, the fluorescent material core particles that have been subjected to the first heat treatment may be washed with, for example, deionized water and filtered for separation of water from the fluorescent material core particles, for the purpose of removing the remaining urea and silicate. After washing, the particles may be dried.

After the preheat treatment and before the first heat treatment, or after the first heat treatment and before the second heat treatment, the fluorescent material core particles that have been subjected to the preheat treatment or the first heat treatment may be dried. The temperature for the drying treatment is preferably lower than the temperature for the preheat treatment or the temperature for the first heat treatment. Specifically, the temperature for the drying treatment is preferably lower than the temperature for the preheat treatment or the first heat treatment, in a range of 80° C. or higher and 120° C. or lower. The drying time may be, for example, in a range of 1 hour or more and 24 hours or less. The drying treatment may be carried out before the above-mentioned washing treatment.

Second Heat Treatment

The fluorescent material core particles having been processed for the first heat treatment may be subjected to a second heat treatment at a temperature in a range of 350° C. or higher and 600° C. or lower. The fluorescent material core particles having, as formed on the surfaces through the first heat treatment, a first film and a second film in the order from the side of the fluorescent material core particle are further subjected to a second heat treatment to remove the impurities such as urea remaining on the first film and/or the second film. Through the second heat treatment of the fluorescent material core particles having been subjected to the first heat treatment, the density of the first film and the second film formed by the first heat treatment can be increased to enhance the function of the films as protective films. The nitride fluorescent material obtained after the second heat treatment is protected by the double film of the first film and the second film whose density has been increased by the second heat treatment and is hardly influenced by water and carbon dioxide existing in external environments and can be protected from color change owing to composition change, that is, the durability of the nitride fluorescent material is enhanced.

The temperature for the second heat treatment may be within a range of 350° C. or higher and 600° C. or lower, and is, for the purpose of increasing the density of the first film and the second film without forming any defects in the crystal structure of the fluorescent material core particles, preferably within a range of 400° C. or higher and 550° C. or lower.

The treatment time for the second heat treatment is preferably in a range of 3 hours or more and 24 hours or less, more preferably in a range of 4 hours or more and 20 hours or less, even more preferably in a range of 5 hours or more and 18 hours or less. When the treatment time for the second heat treatment is in a range of 3 hours or more and 24 hours or less, the density of the first film and the second film can be increased by the second heat treatment and the impurities such as urea remaining during the first heat treatment can be removed.

The atmosphere for the second heat treatment may be an atmosphere containing oxygen or may also be an air atmosphere, since the double protective film of the first film and the second film has been formed on the surfaces of the fluorescent material core particles by the first heat treatment. The pressure in the second heat treatment may be an atmospheric pressure.

The second heat treatment may be carried out for example, using a gas-pressed electric furnace. The second heat treatment may be carried out by filling the particles in a crucible, a boat formed of the same material as that used for the heat treatment of the raw material mixture mentioned hereinabove. For the crucible or the boat in which the fluorescent material core particles having, as formed, the first film and the second film are filled in the second heat treatment, an alumina ($Al_2O_3$) or molybdenum (Mo) material may also be used. Among these, a crucible or a boat made of a boron nitride material is preferably used.

Nitride Fluorescent Material

The nitride fluorescent material may contain fluorescent material core particles having a composition containing Sr, Ca, Eu, Si, Al, and N, in which, when a molar ratio of Al in the composition is 1, a molar ratio of Sr is in a range of 0.45 or more and 1.1 or less, a molar ratio of Ca is in a range of more than 0 and less than 0.55, a molar ratio of Eu is in a range of more than 0 and 0.033 or less, a total molar ratio of Sr, Ca, and Eu is 1.1 or less, a molar ratio of Si is in a range of 0.81 or more and 1.21 or less, and a molar ratio of N is in a range of 2.25 or more and 3.85 or less, and may contain, on a surface of the fluorescent material core particles and in an order from a side of the fluorescent material core particles, a first film containing at least one element selected from the group consisting of Sr, Ca, Eu, Si, and Al, and oxygen, and a second film containing at least Si.

Preferably, the nitride fluorescent material is produced according to a production method according to an embodiment of the present disclosure.

Fluorescent Material Core Particles

Preferably, in the nitride fluorescent material, the fluorescent material core particles have a composition represented by the following formula (I).

$$Sr_uCa_vEu_wSi_xAl_yN_z \qquad (I)$$

wherein u, v, w, x, y, and z each represent a number satisfying $0.5 \le u \le 1.0$, $0 < v < 0.5$, $0 < w \le 0.03$, $u+v+w \le 1.0$, $0.9 \le x \le 1.1$, $0.9 \le y \le 1.1$, $2.5 \le z \le 3.5$.

In the formula (I), the parameter x that indicates a molar ratio of an activating element Eu in the fluorescent material core particles may be in a range of 0.0001 or more and 0.03 or less ($0.0001 \le w \le 0.03$), more preferably in a range of 0.001 or more and 0.025 or less ($0.001 \le w \le 0.025$). In the formula (I), the parameter v that indicates a molar ratio of Ca may be in a range of 0.001 or more and less than 0.5 ($0.001 \le v < 0.5$), or may be in a range of 0.005 or more and less than 0.5 ($0.005 \le v < 0.5$).

The volume-average particle size of the fluorescent material core particles is preferably in a range of 1 μm or more and 40 μm or less, more preferably in a range of 5 μm or more and 35 μm or less, even more preferably in a range of 5 μm or more and 30 μm or less, and even more preferably in a range of 10 μm or more and 30 μm or less. When the volume-average particle size of the fluorescent material core particles is in a range of 1 μm or more and 40 μm or less, the nitride fluorescent material can be prevented from color change while maintaining the luminous efficiency even though the first film and the second film are formed on the core particles. The volume-average particle size of the fluorescent material core particles is a volume-average particle size (median diameter: Dm) to reach 50% of cumulative volume frequency of particle diameters calculated as volume fraction from smaller particles in volume-based particle size distribution, as measured using a laser diffractometric particle size distribution measuring apparatus (for example, product name, MASTER SIZER 3000, manufactured by Malvern Panalytical Ltd.).

First Film

The nitride fluorescent material may contain, on surfaces of the fluorescent material core particles, a first film that contains at least one element selected from the group consisting of Sr, Ca, Eu, Si, and Al, and oxygen. The first film may be formed by the above-mentioned preheat treatment or the first heat treatment of bringing the fluorescent material core particles into contact with water. Since the nitride fluorescent material contains the first film on the surfaces of the fluorescent material core particles, it is hard for the elements forming the crystal structure of the fluorescent material core particles to react with carbon dioxide and water even in an environment in which the temperature and the humidity are relatively high. In the nitride fluorescent material, the surfaces of the fluorescent material core particles are protected from the external environments by the first film so that color change of the nitride fluorescent material can be prevented more and the durability is improved more.

Preferably, the thickness of the first film is in a range of 10 nm or more and 100 nm or less. When the first film is thicker, it is hard for the elements contained in the surfaces and thereabround of the fluorescent material core particles to react with carbon dioxide and water, but on the other hand, when the first film is too thick, a nitride fluorescent material having a desired color may not be obtained. In the case where the volume-average particle size of the fluorescent material core particles is in a range of 1 μm or more and 40 μm or less, the thickness of the first film preferably is in a range of 10 nm or more and 100 nm or less. The thickness of the first film may be in a range of 20 nm or more and 100 nm or less, or in a range of 30 nm or more and 100 nm or less. Also the thickness of the first film may be in a range of 10 nm or more and 50 nm or less, or in a range of 10 nm or more and 40 nm or less, or in a range of 10 nm or more and 30 nm or less. The thickness of the first film and the second film on the surfaces of the fluorescent material core particles can be measured, for example, on a SEM micrograph of a reflection electron image of a cross section of a nitride fluorescent material using a field emission scanning electron microscope (FE-SEM), for example, according to the method described in the section of Examples given hereinunder.

Second Film

The nitride fluorescent material may contain, on the surfaces of the fluorescent material core particles and in the order from the side of the fluorescent material core particle, the above-mentioned first film and a second film containing at least Si. The second film may be formed by the above-mentioned first treatment of bringing the fluorescent material core particles into contact with urea, a silicate and water, and preferably, the density of the first film and the second film is increased through the above-mentioned second heat treatment. The nitride fluorescent material additionally contains the second film on the surfaces of the fluorescent material core particles, and accordingly, the fluorescent material core particles can be protected relatively stably from external environments in which the temperature and the humidity are relatively high to prevent more effectively color change of the nitride fluorescent material and improve more effectively the durability.

Preferably, the thickness of the second film is in a range of 10 nm or more and 200 nm or less, more preferably within a range of 10 nm or more and 150 nm or less. The thickness of the second film may be in a range of 20 nm or more and 150 nm or less, or in a range of 30 nm or more and 150 nm or less. Also the thickness of the second film may be in a range of 10 nm or more and 50 nm or less, or in a range of 10 nm or more and 40 nm or less, or in a range of 10 nm or more and 30 nm or less. The second film is preferably thicker, since a thicker second film can prevent penetration of carbon dioxide and water to protect fluorescent material core particles. On the other hand, when the second film is too thick, a nitride fluorescent material having a desired color may not be obtained, owing to the first film and the second film formed on the surfaces of the fluorescent material core particles. In the case where the volume-average particle size of the fluorescent material core particles is in a range of 1 μm or more and 40 μm or less, the thickness of the second film preferably is in a range of 10 nm or more and 200 nm or less.

The molar ratio of Si and oxygen contained in the second film is preferably larger than the molar ratio of Si and oxygen contained in the first film. The second film is formed through the first heat treatment of bringing the fluorescent material core particles into contact with urea, a silicate, and water, and is presumed to contain silicon dioxide formed by the reaction of urea and a silicate. When the molar ratio of Si and oxygen contained in the second film is larger than the molar ratio of Si and oxygen contained in the first film, the second film can be a stable protective film to more stably protect the fluorescent material core particles. The molar ratio of Si and oxygen contained in the first film means a total value of the molar ratio of Si contained in the first film and the molar ratio of oxygen contained in the first film. The molar ratio of Si and oxygen contained in the second film means a total value of the molar ratio of Si contained in the second film and the molar ratio of oxygen contained in the second film.

Preferably, the nitride fluorescent material absorbs light falling in a wavelength range of 400 nm or more and 570 nm or less, that is, in a range from UV rays to a short wavelength side of visible light to emit light whose emission peak wavelength is in a range of 600 nm or more and 670 nm or less. More preferably, the nitride fluorescent material is excited by light in a wavelength range of 400 nm or more and 570 nm or less to emit light whose emission peak wavelength is in a range of 610 nm or more and 650 nm or less, more preferably within a range of 610 nm or more and 640 nm or less. The full width at half maximum of the light emission spectrum of the nitride fluorescent material is, for example, 80 nm or less, and is preferably 75 nm or less. The full width at half maximum (FWHM) of an emission peak of a light emission spectrum means a wavelength width of a light emission peak that indicates a value of 50% of the maximum value of the emission peak of a light emission spectrum.

For example, combined with an excitation light source such as LED or LD, the nitride fluorescent material can be used as a light emitting device for use in illumination devices, backlights for liquid-crystal display devices, and others.

The excitation light source for use in the light emitting device may be an excitation light source that emits light having a wavelength in range of 400 nm or more and 570 nm or less. When the excitation light source having the wavelength range is used, a light emitting device having a high light emission intensity of the nitride fluorescent material can be provided. The light emitting element to be used as the excitation light source for the light emitting device preferably has a light emission peak wavelength in a range of 420 nm or more and 500 nm or less, more preferably in a range of 420 nm or more and 460 nm or less.

As the light emitting element, preferably, a semiconductor light emitting element using a nitride semiconductor ($In_XAl_YGa_{1-X-Y}N$, $0 \leq X$, $0 \leq Y$, $X+Y \leq 1$) is used. When the semiconductor light emitting element is used as the excitation light source for the light emitting device, a stable light emitting device having a high input linearity relative to output with high efficiency and highly resistant to mechanical shock can be obtained. The full width at half maximum of the light emission spectrum of the light emitting element is, for example, preferably 30 nm or less.

The light emitting device can use, for example, a nitride fluorescent material containing fluorescent material core particles having a composition represented by the formula (I), a first film containing at least one element selected from the group consisting of Sr, Ca, Eu, Si, and Al, and oxygen and a second film containing at least Si. The light emitting device can also use any other fluorescent material than the nitride fluorescent material. For example, the device can use the nitride fluorescent material as a first fluorescent material and can use a second fluorescent material having a light emission peak wavelength differing from that of the first fluorescent material. The first fluorescent material for use herein may be a single fluorescent material or may be a combination of two or more different fluorescent materials as long as it has a light emission peak wavelength in an intended wavelength range. Also the second fluorescent material may be a single fluorescent material or may be a combination of two or more different fluorescent materials as long as it has a light emission peak wavelength in an intended wavelength range.

Figure 7:
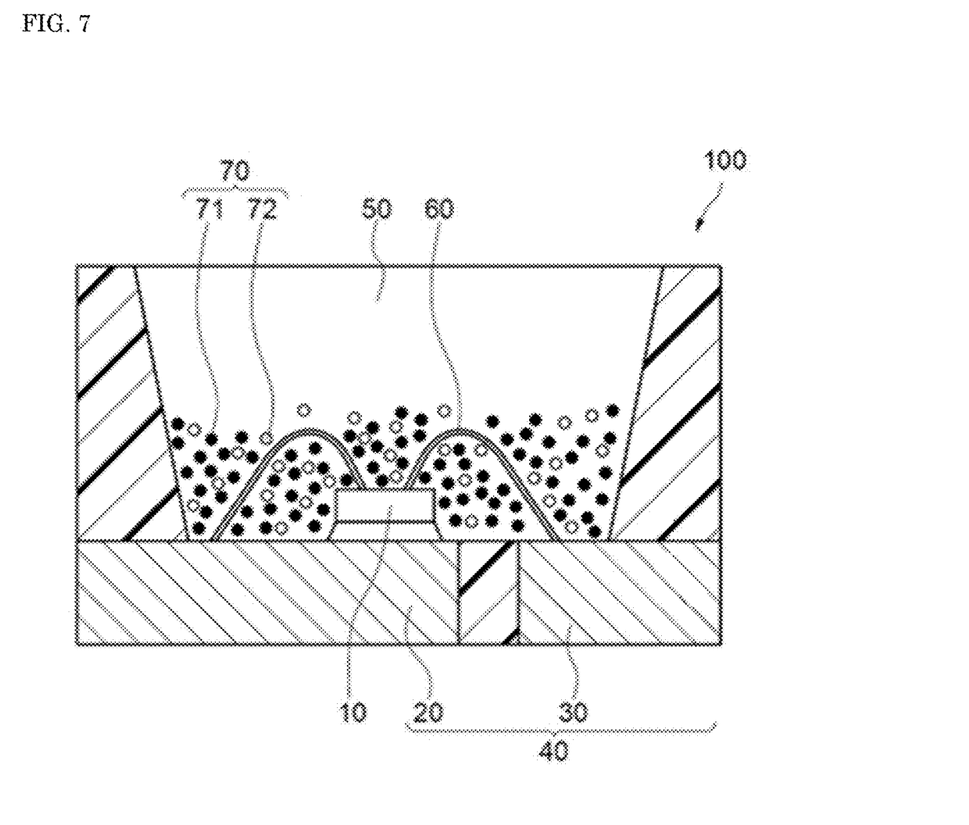
FIG. 7 is a schematic cross-sectional view showing an example of a light emitting device containing a nitride fluorescent material.

An example of a light emitting device is described with reference to the drawing. FIG. 7 is a schematic cross-sectional view showing an example of a light emitting device. The light emitting device is an example of a surface-mount light emitting device.

The light emitting device 100 is provided with a package having a recess part formed by lead electrodes 20 and 30 and a molded body 40, a light emitting element 10, and a sealing member 50 to cover the light emitting element 10. The light emitting element 10 is arranged inside the recess part, and is electrically connected to the pair of positive and negative lead electrodes 20 and 30 via a conductive wire 60. The sealing member 50 is filled in the recess part to cover the light emitting element 10, and seals up the recess part of the package. The sealing member 50 contains, for example, a florescent material 70 for conversion of light from the light emitting element 10, and a resin. Further, the fluorescent material 70 contains a first fluorescent material 71 and a second fluorescent material 72. Apart of the pair of positive and negative lead electrodes 20 and 30 are exposed out on the outside surface of the package. Via these lead electrodes 20 and 30, the light emitting device 100 receives power from the outside to emit light.

The sealing member 50 contains the resin and the fluorescent material 70, and is formed to cover the light emitting element 10 arranged inside the recess part of the light emitting device 100.

EXAMPLES

The present disclosure is hereunder specifically described by reference to the following Examples. The present disclosure is not limited to these Examples.

Preparation of Fluorescent Material Core Particles

Raw materials were weighed in such a manner that the resultant composition could contain Sr, Ca, Eu, Al, Si, and N and that, when the molar ratio of Al in the composition is 1, the molar ratio of Sr, C, Eu, and Si could be the charge-in composition ratio mentioned below. As the raw materials, $SrN_u$ (corresponding to u=⅔, a mixture of $Sr_2N$ and SrN), $Ca_3N_2$, EuN, AlN, and $Si_3N_4$ were used. The raw materials were weighed in a glove box in an inert gas atmosphere in such a manner that a molar ratio of the charge-in composition ratio of each raw material could be Sr:Ca:Eu:Al:Si=0.937:0.049:0.014:1.0:1.0, and then mixed to obtain a raw material mixture. The raw material mixture was filled in a crucible formed of boron nitride, and heat-treated in a nitrogen gas atmosphere under a gas pressure of 0.92 MPa as a gauge pressure (1.02 MPa as an absolute pressure) and at a temperature in a range of 1900° C. or more and 2100° C. or lower, for a period of time in a range of 0.5 hours or more and 24 hours or less to give a calcined body to be a fluorescent material core having a composition represented by $Sr_{0.937}Ca_{0.049}Eu_{0.014}Al_1SiN_3$ as a charge-in composition ratio. Subsequently, the calcined body was dispersed and classified to obtain fluorescent material core particles.

Example 1

Preheat Treatment

400% by volume of deionized water was added to 100% by volume of the resultant fluorescent material core particles to bring the fluorescent material core particles into contact with water, and in that condition, the fluorescent material core particles were heat-treated in an air atmosphere under an atmospheric pressure (0.10 MPa) at a temperature of 120° C. for 9 hours. After thus preheat-treated, the fluorescent material core particles were washed with deionized water and filtered to give preheat-treated fluorescent material core particles. The preheat-treated fluorescent material core particles were then dried in a drier at a temperature of 100° C. for 10 hours. On the surfaces of the thus-dried fluorescent material core particles, formed was a first film containing elements of Sr, Al, Si, and N, and oxygen.

First Heat Treatment

400% by volume of deionized water was added to 100% by volume of the fluorescent material core particles containing the first film formed through the preheat treatment, and then, as a ratio by mass, 16% of potassium silicate ($K_2SiO_3$) and 6% of urea were added to 100% of the fluorescent material core particles containing the first film, and while kept in contact with water, potassium silicate and urea under the condition, the fluorescent material core particles were subjected to a first heat treatment in an air atmosphere under an atmospheric pressure (0.10 MPa) at a temperature in a range of 90° C. to 100° C. for 6 hours. In the first heat treatment, potassium silicate and urea were used each in an amount such that the molar ratio could be 1/1. After the first heat treatment, the florescent material core particles were washed with deionized water and filtered to give fluorescent material core particles that had been subjected to the first heat treatment. After the first heat treatment, the fluorescent material core particles were dried in a dryer at a temperature of 100° C. for 10 hours. On the surfaces of the thus-dried fluorescent material core particles, formed were a first film containing elements of Sr, Al, Si, and N, and oxygen, and a second film containing at least Si in the order from the side of the fluorescent material core particle. The second film also contained urea and silicon dioxide ($SiO_2$) formed through hydrolysis of potassium silicate.

Second Heat Treatment

The fluorescent material core particles having the first film and the second film obtained through the first heat treatment were filled in an alumina crucible, and subjected to a second heat treatment in an air atmosphere under an atmospheric pressure (0.10 MPa) at a temperature of 400° C. for 10 hours. Left cooled down to room temperature after the second heat treatment, there was obtained a nitride fluorescent material of Example 1 having the first film and the second film on the surfaces of the fluorescent material core particles in the order from the side of the fluorescent material core particle. Including those in Example 1, the heat treatment conditions in Examples and Comparative Examples to be given hereinunder are shown in Table 1 below.

Example 2

A nitride fluorescent material of Example 2 was obtained in the same manner as in Example 1 except that the second heat treatment was carried out at a temperature of 400° C. for 3 hours.

Example 3

A nitride fluorescent material of Example 3 was obtained in the same manner as in Example 1 except that the second heat treatment was carried out at a temperature of 350° C. for 3 hours.

Example 4

A nitride fluorescent material of Example 4 was obtained in the same manner as in Example 1 except that the preheat treatment was omitted.

Comparative Example 1

Fluorescent material core particles processed for none of preheat treatment, first heat treatment and second heat treatment were washed with deionized water added in an amount of 400% by volume or more relative to 100% by volume of the core particles, and the thus-washed fluorescent material core particles kept in contact with an acid solution (hydrochloric acid solution) having a pH of 1 to 2 or so for 10 minutes or more and 5 hours or less while stirring, then the supernatant was removed, and the core particles were further washed with deionized water. After thus washed, the fluorescent material core particles are a nitride fluorescent material of Comparative Example 1.

Comparative Example 2

A nitride fluorescent material of Comparative Example 2 was obtained in the same manner as in Example 1 except that the preheat treatment was carried out once at a temperature of 120° C. for 9 hours and the first heat treatment was omitted.

Comparative Example 3

A nitride fluorescent material of Comparative Example 3 was obtained in the same manner as in Example 1 except that the preheat treatment was carried out once in the same manner as in Comparative Example 2, and after drying in the same manner as in Example 1, the second time preheat treatment was carried out at a temperature of 120° C. for 9 hours, and the first heat treatment was omitted.

Comparative Example 4

A nitride fluorescent material of Comparative Example 4 was obtained in the same manner as in Example 1 except that the preheat treatment was carried out twice in the same manner as in Comparative Example 3, and after drying in the same manner as in Example 1, the third time preheat treatment was carried out at a temperature of 120° C. for 9 hours, and the first heat treatment was omitted.

Evaluation of Nitride Fluorescent Material
Volume-Average Particle Size (Dm)

Of each nitride fluorescent material of Examples and Comparative Examples, the volume-average particle size (median diameter: Dm) to reach 50% of cumulative volume frequency of particle diameters calculated as volume fraction from smaller particles in volume-based particle size distribution was measured, using a laser diffractometric particle size distribution measuring apparatus (MASTER SIZER 3000, manufactured by Malvern Panalytical Ltd.). The results are shown in Table 1 below.

Light Emission Characteristics

Figure 3:
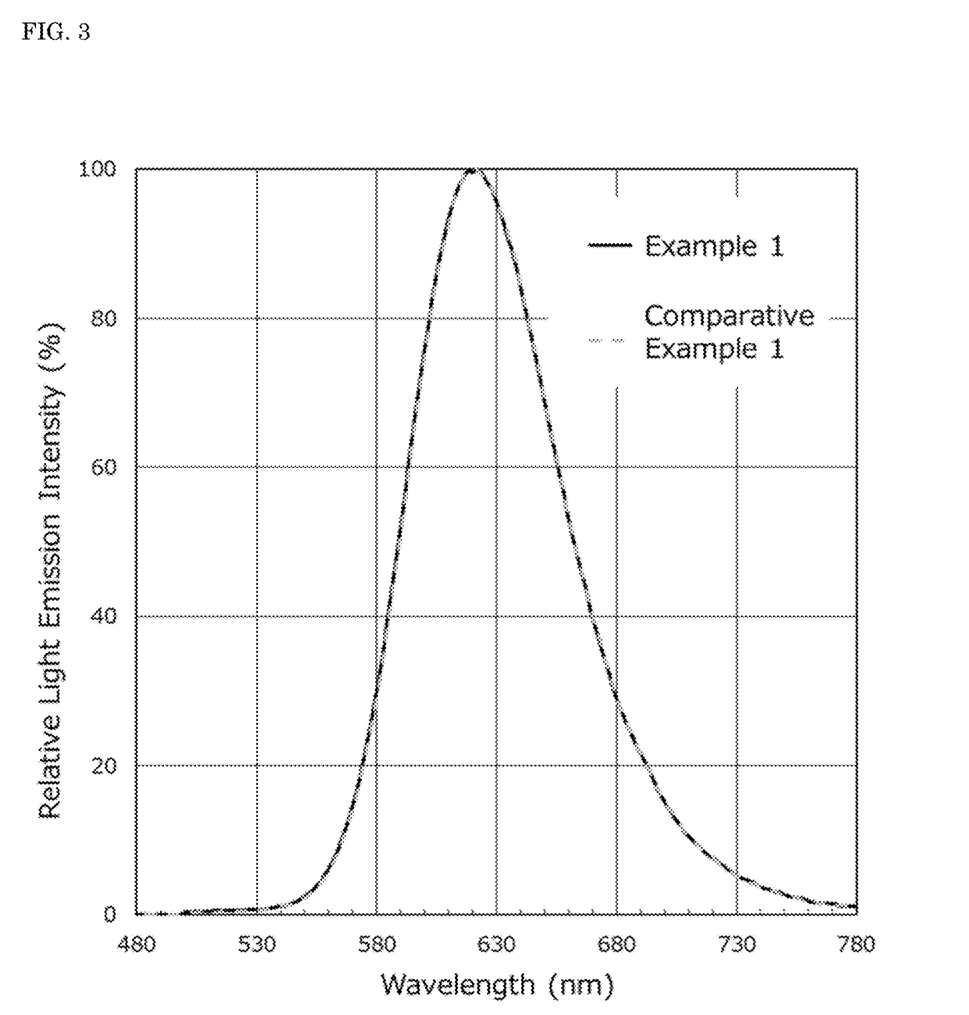
FIG. 3 is a diagram showing light emission spectra of the nitride fluorescent material of Example 1 and the nitride fluorescent material of Comparative Example 1.

Light emission characteristics of each nitride fluorescent material were measured. Using a spectrofluorophotometer QE-2000, manufactured by Otsuka Electronics Co., Ltd.), light emission characteristics of each nitride fluorescent material were measured with an excitation light having a wavelength or 450 nm. From the measured light emission spectrum, the relative light emission intensity (%) and the peak wavelength ($\lambda p$: nm) of each nitride fluorescent material were determined. The relative light emission intensity (%) is a relative light emission intensity as calculated based on the relative light emission intensity, 100% of the nitride fluorescent material of Comparative Example 1. The results are shown in Table 1. FIG. 3 shows the light emission spectra of the nitride fluorescent materials of Example 1 and Comparative Example 1.

Durability Evaluation (High-Temperature High-Humidity Evaluation)

Using a spectrofluorophotometer (QE-2000, manufactured by Otsuka Electronics Co., Ltd.), the chromaticity (x, y) of the CIE (Commission Internationale de l'Eclarirage) chromaticity coordinates of each nitride fluorescent material was measured with an excitation light having a wavelength or 450 nm. Stored in an environmental testing equipment at a temperature of 130° C. and a relative humidity of 100% for 72 hours, each nitride fluorescent material was tested for durability. The y value of the chromaticity coordinate of the nitride fluorescent material before the durability test is referred to as an initial value, and an absolute value of the difference in the y value of the nitride fluorescent material after the durability test was measured as $\Delta y$. The results are shown in Table 1 below.

Film Thickness Measurement

On the SEM micrograph of a cross section of each nitride fluorescent material of Examples 1 and 4 and Comparative Examples 1 to 4, the first film and the second film were visually recognized, and the thickness of the first film and the thickness of the second film in different sites of individual nitride fluorescent materials were measured. Specifically, according to a method of taking a SEM micrograph of a reflection electron image to be mentioned below, a SEM micrograph of a cross section of each nitride fluorescent material of the Examples and Comparative Examples was taken, one and more and three or less SEM micrographs of the cross section of the nitride fluorescent material of the Examples and Comparative Examples were visually observed, and the thickness of the first film and the thickness of the second film in one or more and three or less sites of the cross section of each fluorescent material were measured. On the SEM micrograph of the cross section of the nitride fluorescent material taken according to the method mentioned below, the thickness of the first film and the thickness of the second film capable of being recognized visually of the individual nitride fluorescent materials differ in the individual nitride fluorescent material particles and also differ in the different sites of the cross section of each nitride fluorescent material. Table 2 below shows ranges of the thickness of the first film and the thickness of the second film of the nitride fluorescent materials of the Examples and Comparative Examples measured in the manner as above.

TABLE 2

|  | First Film (nm) | Second Film (nm) |
| --- | --- | --- |
| Example 1 | 30 or more and 100 or less | 30 or more and 150 or less |
| Example 4 | 10 or more and 30 or less | 10 or more and 30 or less |
| Comparative Example 1 | 0 | 0 |
| Comparative Example 2 | 20 or more and 40 or less | 0 |
| Comparative Example 3 | 50 or more and 70 or less | 0 |
| Comparative Example 4 | 90 or more and 120 or less | 0 |

TABLE 1

| | Heat Treatment Conditions | | | Volume-Average Particle Size Dm (nm) | Light Emission Characteristics | | Durability Evaluation Color Change $\Delta y$ |
| --- | --- | --- | --- | --- | --- | --- | --- |
| | Preheat Treatment | First Heat Treatment | Second Heat Treatment | | Emission Peak Wavelength $\lambda p$ (nm) | Relative Emission Intensity (%) | |
| Example 1 | 120° C., 9 hrs × once | from 90° C. to 100° C., 6 hrs | 400° C., 10 hrs | 28.8 | 622 | 104.1 | 0.0004 |
| Example 2 | 120° C., 9 hrs × once | from 90° C. to 100° C., 6 hrs | 400° C., 3 hrs | 28.7 | 620 | 103.2 | 0.0004 |
| Example 3 | 120° C., 9 hrs × once | from 90° C. to 100° C., 6 hrs | 350° C., 3 hrs | 28.9 | 621 | 107.1 | 0.0005 |
| Example 4 | — | from 90° C. to 100° C., 6 hrs | 400° C., 10 hrs | 29.8 | 622 | 104.2 | 0.0010 |
| Comparative Example 1 | — | — | — | 25.0 | 621 | 100.0 | 0.0111 |
| Comparative Example 2 | 120° C., 9 hrs × once | — | 400° C., 10 hrs | 26.5 | 621 | 105.9 | 0.0068 |
| Comparative Example 3 | 120° C., 9 hrs × twice | — | 400° C., 10 hrs | 27.1 | 619 | 107.2 | 0.0034 |
| Comparative Example 4 | 120° C., 9 hrs × three times | — | 400° C., 10 hrs | 27.2 | 622 | 104.6 | 0.0059 |

As shown in Table 1, the nitride fluorescent materials of Examples 1 to 4 still have, even after left in high-temperature and high-humidity environments, a smaller value of color change Δy than those of the Comparative Examples. From the results, it is presumed that both the first film and the second film functioned as a protective film to retard color change and to improve durability. The nitride fluorescent materials of Examples 1 to 4 had a higher relative light emission intensity than the nitride fluorescent material of Comparative Example 1, and the relative light emission intensity of the nitride fluorescent materials of Comparative Examples 2 to 4 was also higher than that of Comparative Example 1, and there was not seen any significant change in the light emission peak wavelength. From the results, it is confirmed that the nitride fluorescent materials of Examples 1 to 4 still maintained a high luminous efficiency even after the first film and the second film were formed through the first heat treatment and the second heat treatment. The value of color change Δy in Example 3 was nearly on the same level as that in Examples 1 and 2, and it is presumed that, when the temperature in the second heat treatment is 350° C. or higher, the density of the first film and the second film can increase so that the function of the films as a protective film can be enhanced to improve the durability of the nitride fluorescent materials. The nitride fluorescent material of Example 4 was not preheat-treated and, as shown in Table 2, the thickness of the first film tended to be relatively small. Consequently, the nitride fluorescent material of Example 4 had a higher value of color change Δy than those of Examples 1 to 3, but was nearly ¹/₁₀ of the color change Δy of Comparative Example 1.

As shown in FIG. 3, the light emission spectrum of Example 1 almost overlaps with the light emission spectrum of Comparative Example 1, from which it is confirmed that the nitride fluorescent material having, as formed on the surfaces of the fluorescent material core particles, a double film of a first film and a second film can maintain a high light emission intensity like the nitride fluorescent material not having a film, without changing the light emission spectrum.

The nitride fluorescent material of Comparative Example 1 does not have a first film and a second film, when left in high-temperature and high-humidity environments, the value of color change Δy was larger than that in the Examples and it is presumed that the nitride fluorescent material degraded. The nitride fluorescent materials of Comparative Examples 2 to 4 were preheat-treated and subjected to the second heat treatment, but not to the first heat treatment, and consequently, a second film was not formed, the value of color change Δy was larger than that of the nitride fluorescent materials of Examples 1 to 4, and the durability was not enhanced. As shown in Table 2, on the nitride fluorescent materials of Comparative Examples 2 to 4, the thickness of the first film formed increased with increase in the frequency of preheat treatment. However, on the nitride fluorescent materials of Comparative Examples 2 to 4, the first film often cracked when the thickness increased, and consequently, the value of color change Δy in those Comparative Examples was larger than that in the Examples, that is, the durability of the materials of the Comparative Examples was not enhanced.

SEM Image—Secondary Electron Image

Figure 5:
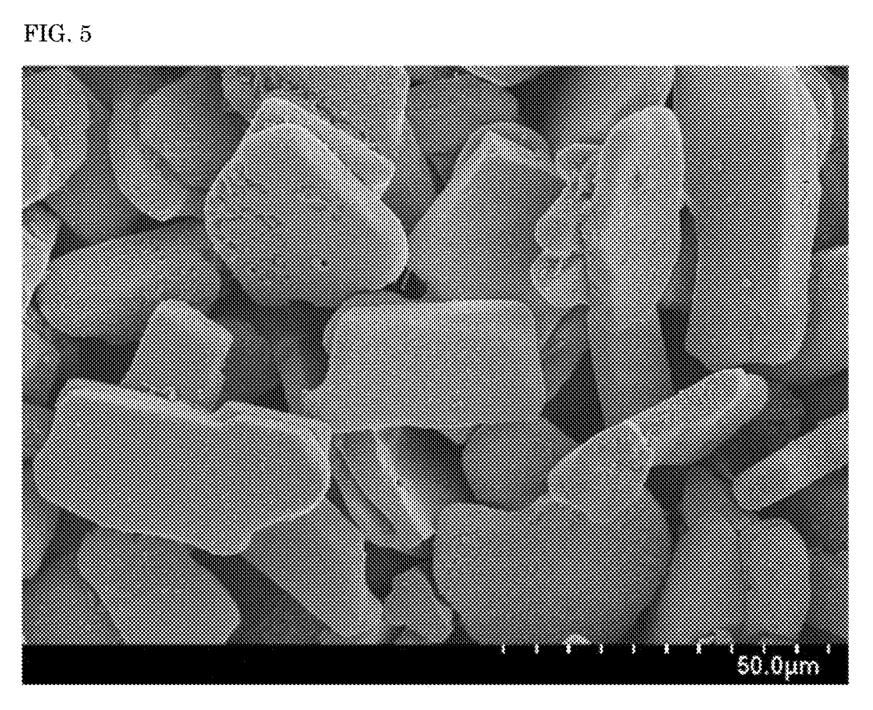
FIG. 5 is a SEM micrograph of a secondary electron image of the nitride fluorescent material of Example 1.
Figure 6:
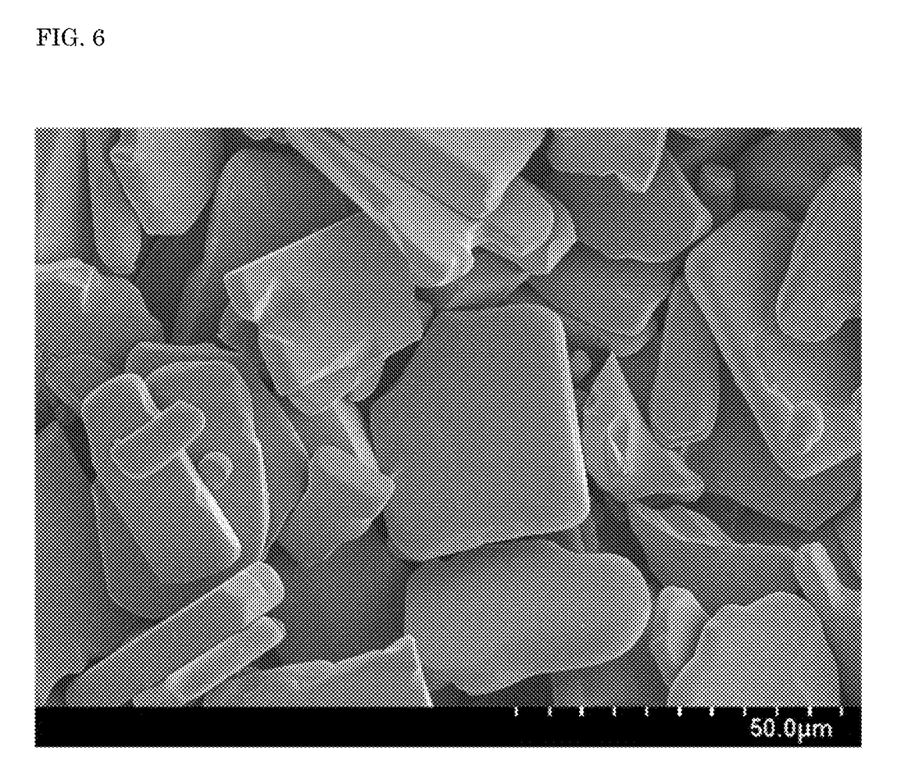
FIG. 6 is a SEM micrograph of a secondary electron image of the nitride fluorescent material of Comparative Example 1.

Using a scanning electron microscope (SEM) (SU3500, manufactured by Hitachi High-Technologies Corporation), SEM micrographs of the nitride fluorescent materials of Comparative Examples 1 to 3 and Example 1 were taken. FIG. 5 is a SEM micrograph of the nitride fluorescent material of Example 1; and FIG. 6 is a SEM micrograph of the nitride fluorescent material of Comparative Example 1.

SEM Image—Reflection Electron Image

Figure 4:
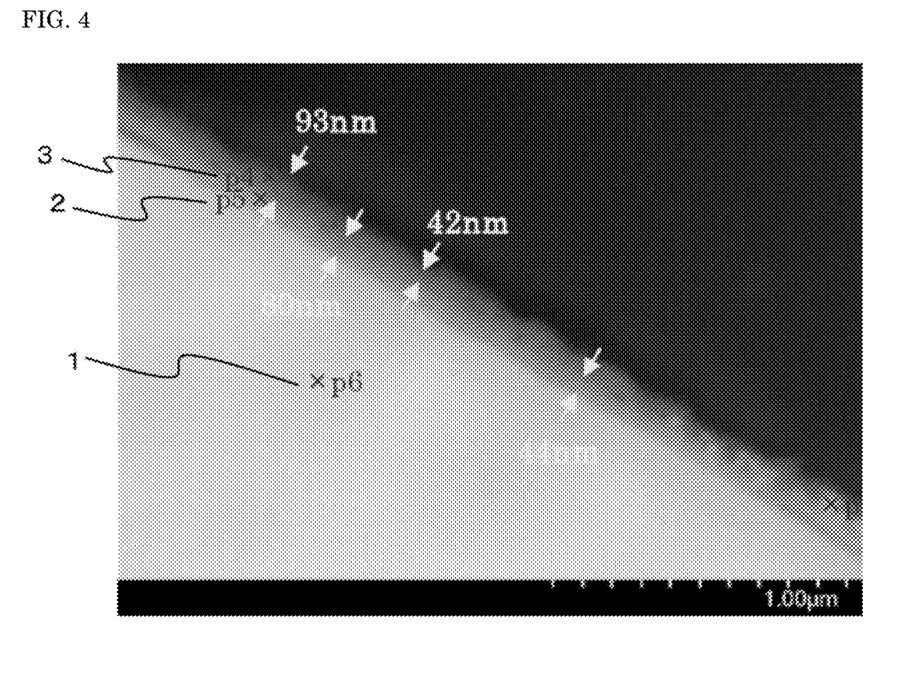
FIG. 4 is a SEM micrograph of a reflection electron image of a partly enlarged cross section of a particle of the nitride fluorescent material of Example 1.

The resultant nitride fluorescent material was buried in an epoxy resin, the resin was cured, and then this was cut so that the cross section of the nitride fluorescent material could be exposed. The surface was polished with sandpaper, and then finished with a cross section polisher (CP). Using a field emission scanning electron microscope (FE-SEM) (SU8230, manufactured by Hitachi High-Technologies Corporation), SEM micrographs of a reflection electron image of a cross section of each nitride fluorescent material of Examples 1 and 4 and Comparative Examples 1 to 4 were taken. FIG. 4 is a SEM micrograph of a reflection electron image of a cross section of the nitride fluorescent material of Example 1.

Composition Analysis

The nitride fluorescent material of Example 1 was buried in an epoxy resin, the resin was cured, and then this was cut so that the cross section of the nitride fluorescent material could be exposed. The surface was polished with sandpaper, then finished with a cross section polisher (CP), and the surface was photographed with a field emission scanning electron microscope (FE-SEM) (SU8230, manufactured by Hitachi High-Technologies Corporation). Thus photographed, the fluorescent material core particle (P6 in FIG. 4), the first film (P5 in FIG. 4) and the second film (P4 in FIG. 4) on the cross section in Example 1 were subjected to composition analysis using an energy dispersive X-ray fluorescence spectrometer (EDX, with an SDD detector manufactured by Horiba, Ltd., acceleration voltage: 5 kV). The results are shown in Table 3. In Table 3, the molar ratio of each element contained in the fluorescent material core particle (P6 in FIG. 4), the first film (P5 in FIG. 4) and the second film (P4 in FIG. 4) was calculated based on the molar ratio of Al, 1.

TABLE 3

| | Analyzed Site | Analyzed Site in FIG. 4 | Molar Ratio of Element (mol %) | | | | | |
|---|---|---|---|---|---|---|---|---|
| | | | Sr | Ca | Al | Si | N | O |
| Example 1 | Second Film | P4 | 0.00 | 0.00 | 1.00 | 6.29 | 0.00 | 22.80 |
| | First Film | P5 | 0.37 | 0.00 | 1.00 | 2.01 | 0.67 | 9.46 |
| | Fluorescent Material Core Particle | P6 | 0.94 | 0.00 | 1.00 | 0.99 | 3.43 | 0.76 |

As shown in Table 3, the molar ratio of Al to Si in the site of the fluorescent material core particle (P6 in FIG. 4) in the nitride fluorescent material of Example 1 was Al:Si=1:0.99, that is, the molar ratio of Al to Si in the composition represented by $Sr_{0.937}Ca_{0.049}Eu_{0.014}AlSiN_3$ of the charge-in composition of the fluorescent material core particles was almost kept as such. In the site of the first film (P5 in FIG. 4) of the nitride fluorescent material of Example 1, the molar ratio of oxygen (O) increased than in the fluorescent material core particle site, which confirmed formation of the first film containing Sr, Al, Si, and N, and O. In the site of the second film (P4 in FIG. 4) of the nitride fluorescent material of Example 1, the molar ratio of Si and O increased than in the site of the first film site on the fluorescent material core particle in which the molar ratio of Al is 1, and from this, it is confirmed that the second film containing at least Si was formed through the first heat treatment.

In the SEM micrograph of a cross section of the nitride fluorescent material of Example 1, as shown in FIG. 4, it is confirmed that the first film 2 (P5) and the second film 3 (P4) are formed in that order from the fluorescent material core particle 1, on the surface of the fluorescent material core particle 1 (P6).

In the SEM micrograph of FIG. 5, the surface of the nitride fluorescent material of Example 1 is rough and deposits are confirmed to adhere to the surfaces of the nitride core particles. On the other hand, in the SEM micrograph of FIG. 6, the surface of the nitride fluorescent material of Comparative Example 1 is smooth as compared with the surface of the nitride fluorescent material of Example 1, and few deposits are confirmed to adhere to the surface.

The nitride fluorescent material of an aspect of the present disclosure may be favorably used for light emitting devices applicable to light sources for illumination, LED displays, backlight sources for liquid crystal displays, traffic lights, illumination switches, light sources for projectors, various sensors, various indicators, etc.

The invention claimed is:

1. A method for producing a nitride fluorescent material, comprising:
    preparing fluorescent material core particles having a composition containing Sr, Ca, Eu, Al, Si, and N, in which, when a molar ratio of Al in the composition is 1, a molar ratio of Sr is in a range of 0.45 or more and 1.1 or less, a molar ratio of Ca is in a range of more than 0 and less than 0.55, a molar ratio of Eu is in a range of more than 0 and 0.033 or less, a total molar ratio of Sr, Ca, and Eu is 1.1 or less, a molar ratio of Si is in a range of 0.81 or more and 1.21 or less, and a molar ratio of N is in a range of 2.25 or more and 3.85 or less represented by the following formula (I):

$$Sr_uCa_vEu_wSi_xAl_yN_z \qquad (I)$$

wherein u, v, w, x, y, and z each satisfy $0.5 \le u \le 1.0$, $0 < v < 0.5$, $0 < w \le 0.03$, $u+v+w \le 1.0$, $0.9 \le x \le 1.1$, $0.9 \le y \le 1.1$, $2.5 \le z \le 3.5$, subjecting the fluorescent material core particles to a first heat treatment by bringing the fluorescent material core particles into contact with urea, a silicate that reacts with urea to form silicon dioxide, and water at a temperature in a range of 70° C. or higher and 150° C. or lower to obtain first heat treated fluorescent material core particles, and subjecting the first heat treated fluorescent material core particles that have been subjected to the first heat treatment, to a second heat treatment at a temperature in a range of 350° C. or higher and 600° C. or lower, wherein before the first heat treatment, the fluorescent material core particles are preheat-treated by bringing them into contact with water at a temperature in a range of 70° C. or higher and 150° C. or lower.

2. The method for producing a nitride fluorescent material according to claim 1, wherein a treatment time for the first heat treatment or the preheat treatment is 1 hour or more and 24 hours or less.

3. The method for producing a nitride fluorescent material according to claim 1, wherein in the first heat treatment, a ratio by mass of the silicate to the preheat-treated fluorescent material core particles is in a range of 2% or more and 5% or less.

4. The method for producing a nitride fluorescent material according to claim 1, wherein a treatment time for the second heat treatment is 3 hours or more and 24 hours or less.

* * * * *